US011636111B1

(12) United States Patent
Tong et al.

(10) Patent No.: US 11,636,111 B1
(45) Date of Patent: Apr. 25, 2023

(54) EXTRACTION OF RELATIONSHIP GRAPHS FROM RELATIONAL DATABASES

(71) Applicant: International Business Machines Corporation, Armonk, NY (US)

(72) Inventors: Chu Yun Tong, Beijing (CN); Cheng Luo, Beijing (CN); Xiao Ming Hu, Beijing (CN); Wen Wen Guo, Beijing (CN); Miao Liu, Beijing (CN); Yi Xin Song, Beijing (CN)

(73) Assignee: International Business Machines Corporation, Armonk, NY (US)

(*) Notice: Subject to any disclaimer, the term of this patent is extended or adjusted under 35 U.S.C. 154(b) by 36 days.

(21) Appl. No.: 17/509,163

(22) Filed: Oct. 25, 2021

(51) Int. Cl.
*G06F 16/28* (2019.01)
*G06F 16/2455* (2019.01)

(52) U.S. Cl.
CPC ........ *G06F 16/2455* (2019.01); *G06F 16/284* (2019.01)

(58) Field of Classification Search
CPC .......................... G06F 16/2455; G06F 16/284
USPC .................................................. 707/769, 803
See application file for complete search history.

(56) References Cited

U.S. PATENT DOCUMENTS

| | | | | |
|---|---|---|---|---|
| 7,461,077 B1 * | 12/2008 | Greenwood | .......... | G06F 3/0482 707/999.102 |
| 7,814,470 B2 * | 10/2010 | Mamou | ................. | G06F 16/254 717/162 |
| 8,041,760 B2 * | 10/2011 | Mamou | ................... | G06Q 10/10 709/200 |
| 8,667,027 B2 * | 3/2014 | Milousheff | ......... | G06F 16/9024 707/802 |
| 10,417,247 B2 | 9/2019 | Venkata et al. | | |
| 10,860,295 B1 * | 12/2020 | Ketireddy | ................ | G06F 8/35 |
| 10,878,000 B2 | 12/2020 | Vaquero Gonzalez et al. | | |
| 11,038,709 B2 | 6/2021 | Park et al. | | |
| 2003/0009392 A1 * | 1/2003 | Perkowski | .......... | G06F 16/9554 705/14.51 |
| 2003/0120642 A1 * | 6/2003 | Egilsson | ................. | G06F 16/83 707/E17.127 |
| 2003/0120682 A1 * | 6/2003 | Bestgen | ............ | G06F 16/24526 |
| 2003/0154189 A1 * | 8/2003 | Egilsson | ................. | G06F 16/30 707/E17.127 |
| 2003/0179228 A1 * | 9/2003 | Schreiber | ................ | G06F 16/25 707/E17.058 |
| 2005/0228808 A1 * | 10/2005 | Mamou | ................. | G06F 16/254 |

(Continued)

*Primary Examiner* — Hanh B Thai
(74) *Attorney, Agent, or Firm* — Cantor Colburn LLP; Teddi Maranzano

(57) ABSTRACT

A computer-implemented method includes analyzing, by a processing unit, a relational database to discover a plurality of static relationships between a plurality of data fields captured in two or more tables. The processing unit can discover a plurality of entity relationships based on observing application-generated queries and results of accessing the relational database in response to one or more test triggers. The processing unit can build one or more relation graphs based on the static relationships and the entity relationships to link a plurality of nodes with one or more edges that define at least one relationship between the nodes. One or more class graphs are formed having a reduced number of edges than the one or more relation graphs. The processing unit can generate one or more result data graphs using the one or more class graphs as a graph database model of the relational database.

20 Claims, 11 Drawing Sheets

(56) References Cited

U.S. PATENT DOCUMENTS

| | | | |
|---|---|---|---|
| 2005/0240592 A1* | 10/2005 | Mamou | G06Q 10/10 707/999.009 |
| 2010/0161651 A1* | 6/2010 | Cras | G06F 16/24544 707/769 |
| 2010/0211924 A1* | 8/2010 | Begel | G06F 16/904 707/E17.069 |
| 2013/0124574 A1* | 5/2013 | Brettin | G16B 50/20 707/798 |
| 2014/0279957 A1* | 9/2014 | Moore | G06F 16/26 707/692 |
| 2015/0026158 A1* | 1/2015 | Jin | G06F 16/90335 707/769 |
| 2016/0034305 A1* | 2/2016 | Shear | H04L 47/70 707/722 |
| 2016/0055184 A1* | 2/2016 | Fokoue-Nkoutche | G06F 16/213 707/809 |
| 2019/0325292 A1* | 10/2019 | Remis | G06N 3/08 |
| 2020/0320045 A1 | 10/2020 | Piecko et al. | |
| 2021/0149851 A1* | 5/2021 | Belezko | G06F 16/211 |
| 2022/0156582 A1* | 5/2022 | Sengupta | G06N 3/042 |

* cited by examiner

US 11,636,111 B1

EXTRACTION OF RELATIONSHIP GRAPHS FROM RELATIONAL DATABASES

BACKGROUND

The present invention generally relates to computer technology and, more specifically, to extraction of relationship graphs to form a graph database from a relational database.

Nonrelational databases, also referred to as "NoSQL" databases are used in computer program products because they can handle huge volumes (Terabytes, Petabytes, or more) of rapidly changing, unstructured data in different ways than a relational (SQL=structured query language) database with rows and tables. Such nonrelational databases have grown in popularity to enable computer programs to handle a large volume of data with a variety of data generated from different sources, such as from the cloud, mobile, social media, big data, and other such technologies. Nonrelational databases enable developers of computer programs to create database systems to store new information and make it readily available for search, consolidation, and analysis.

One approach to implementing a nonrelational database is a graph database. A graph database is a database that uses graph structures with nodes, edges, and properties to represent and store data. The edges can define relationships between nodes that link data together. Querying relationships can be faster than in a relational database, as relationships in a graph database can be directly stored, while relationships in relational approaches are implied and reified at run-time. It can be challenging to convert a relational database into a graph database since relational databases may be implemented with multiple layers of domain-specific relationships, and the relationships embodied with relational databases may be intrinsically established through interactions rather than being explicitly defined and stored within the database.

SUMMARY

According to one or more embodiments of the present invention, a computer-implemented method includes analyzing, by a processing unit, a relational database to discover a plurality of static relationships between a plurality of data fields captured in two or more tables. The processing unit can discover a plurality of entity relationships based on observing application-generated queries and results of accessing the relational database in response to one or more test triggers. The processing unit can build one or more relation graphs based on the static relationships and the entity relationships to link a plurality of nodes with one or more edges that define at least one relationship between the nodes. One or more class graphs are formed having a reduced number of edges than the one or more relation graphs. The processing unit can generate one or more result data graphs using the one or more class graphs as a graph database model of the relational database.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
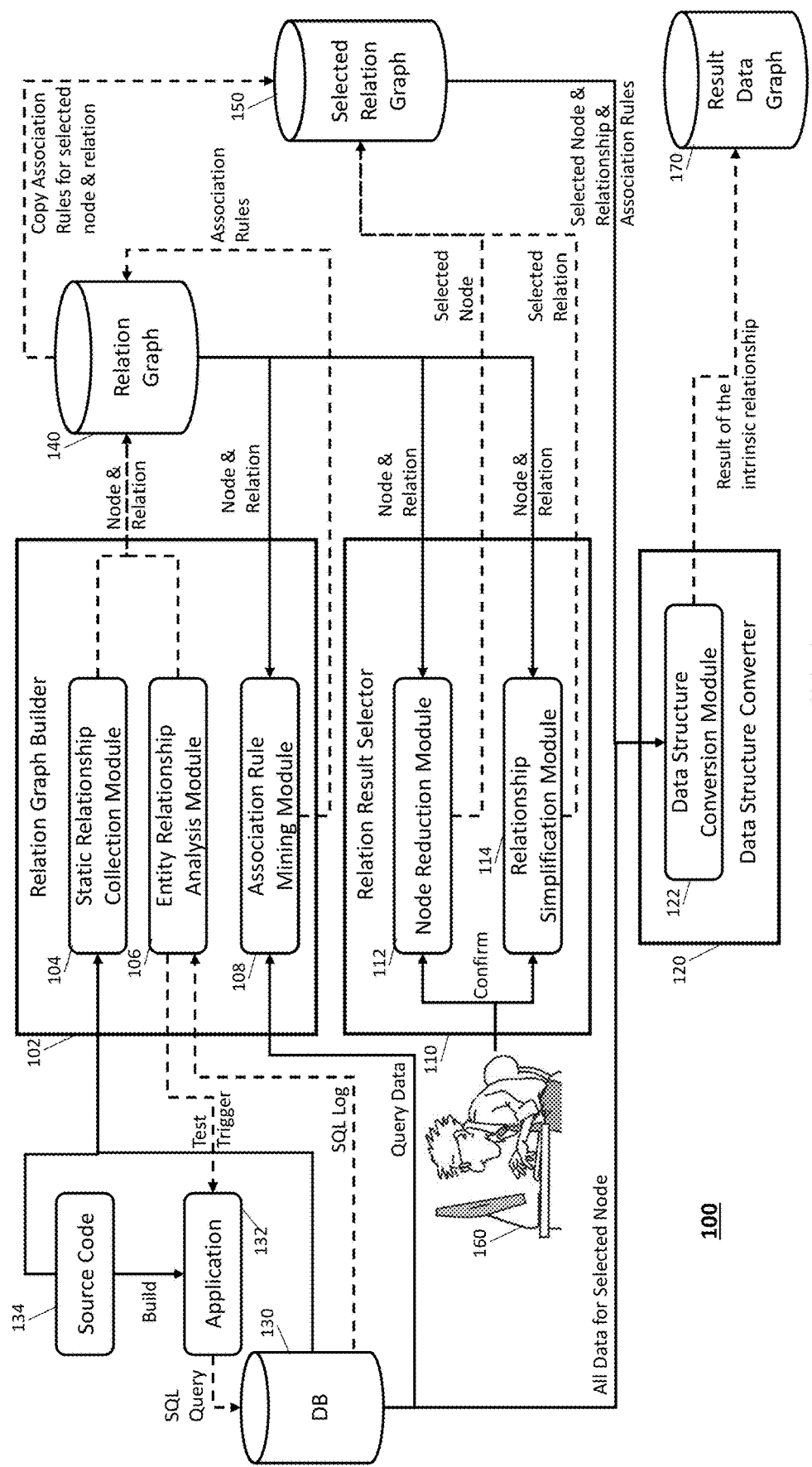
FIG. 1 depicts a system according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted, or modified. Also, the term "coupled", and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Technical solutions are described herein to improve the efficiency of database systems through converting a relational database having intrinsic relationships defined between tables into a graph database. A graph database is a type of nonrelational database (i.e., NoSQL database) that may have wider support and capacity for further expansion while supporting faster query response times than relational databases. Nonrelational databases are widely used by users (and organizations) to develop products (combination of hardware and software) in the technical fields of mobile, web, Internet of Things (IoT), gaming, medical records, e-commerce, media streaming, data analytics, finance, etc. Such products require flexible, scalable, high-performance, and highly functional databases. Relational database systems typically use a predefined structure, which can limit flexibility and adaptability of storing data as the data sources, the data types, and other factors evolve. For example, types of devices used for data generation have changed rapidly from desktop computers, to laptop computers, to mobile devices and wearable devices. Further, the storage of data has also changed, such as from local storage of data to cloud storage for streaming and real-time collaboration. Hence, nonrelational databases, which facilitate scale-out data stores, have gained attraction to support high-traffic Internet applications, such as search engines, media websites, e-commerce, referral websites, etc.

Nonrelational databases are particularly attractive for products that perform operations that need low latency guarantees as data stored in the nonrelational databases scales to large sizes, e.g., 1 Petabyte, etc. Converting an existing (legacy) relational database into a nonrelational database is technical challenging, as there is not a direct one-to-one mapping of structures used in relational databases in combination with relationships defined by how applications use the data to convert into a graph format. To achieve lower latencies, further insights regarding chained connections may be needed to reduce the complexity of relationships between end points in a relationship that spans multiple data points in a sequence.

Embodiments of the present invention address such technical challenges that are rooted in computing technology, particularly database systems, and more specifically relational database systems and graph database systems. Embodiments of the present invention facilitate conversion of relational database systems that include implicitly defined relationships that may not be directly observable through a formalized database schema. Accordingly, embodiments of the present invention provide improvements to computing technology, particularly database systems. Embodiments of the present invention provide practical application to a technical challenge in database systems.

Embodiments of the present invention address the technical challenges described herein by discovering intrinsic relationships that may be defined indirectly in an entity layer that interacts with data in a relational database. Relationship discovery can use a combination of static and dynamic analysis by examining available schema files, source code used to generate applications that interact with the relational database, observing queries generated by applications that interact with the relational database, and results of the queries. Test cases can be passed to an application programming interface (API) of the applications to discover relationships, such as conditional relationships that may appear when input parameters are adjusted.

Embodiments of the present invention facilitate simplifying relation graphs discovered in an initial graph generation process based on relational database information. Further, optimization suggestions can be generated when extracting an entity model that summarizes interactions between nodes and sub-graphs of the relation graphs. Relationships can be summarized as a semantic model that defines how stored data values map to real-world parameters of an entity or business using the data.

FIG. 1 depicts a system 100 according to one or more embodiments of the present invention. The system 100 includes a relation graph builder 102, a relation result selector 110, and a data structure converter 120. The relation graph builder 102 can include a static relationship collection module 104, an entity relationship analysis module 106, and an association rule mining module 108. The relation result selector 110 can include a node reduction module 112 and a relationship simplification module 114. The data structure converter 120 can include a data structure conversion module 122. Although processing performed by the system 100 is grouped in a combination of modules 104-122 in the example of FIG. 1, it will be understood that the processing and functionality as further described herein can be further subdivided or combined in other configurations, as the example of FIG. 1 is provided for purposes of illustration.

The relation graph builder 102 can interface with a relational database 130 and generate a relation graph 140 with nodes and relations discovered through analyzing the structure of the relational database 130 and various interactions with the relational database 130. For example, an application 132 may produce queries in a SQL-compliant format to extract data from the relational database 130. The application 132 can be configured to receive one or more test triggers from the relation graph builder 102 through an API. The test triggers can be test cases that explore various combinations of values and data types in queries to discover how the combinations are mapped to queries that relate multiple tables within the relational database 130. Results of queries can be captured in one or more log files, such as a SQL log, for analysis by the relation graph builder 102. The log may indicate which fields and tables were accessed to produce query results. Query data returned as part of the results can also be analyzed by the relation graph builder 102 to mine for association rules that may not be explicitly defined within the relational database 130 or in source code 134 used to build the application 132. The relation graph 140 can be annotated with association rules discovered by the relation graph builder 102.

As one example, the static relationship collection module 104 of the relation graph builder 102 can focus on collecting and analyzing the static relationships from source code 134, hard coded SQL within the source code 134, and database design information directly available from the relational database 130.

The entity relationship analysis module 106 of the relation graph builder 102 can analyze relationships between database queries that are generated by the application 132 and test triggers fed to an API of the application 132. This information can illustrate data relationships based on the entity/business logic that uses data within the relational database 130.

The association rule mining module 108 of the relation graph builder 102 can access basic relationships determined by the entity relationship analysis module 106 and perform association analysis on the data and relationships to identify intrinsic connections between one or more test triggers and the query results. Further, the association rule mining module 108 can summarize rules between nodes of the relation graph 140 to further detail how nodes interrelate to each other.

The node reduction module 112 of the relation result selector 110 can discover key nodes in the relation graph 140. Key nodes can be intermediate nodes that establish links between two or more nodes. Key nodes can be used to establish a key table which contains basic information or connecting key links between two or more nodes.

The relationship simplification module 114 of the relation result selector 110 can simplify edges between selected nodes. Based on the relation graph 140 and selected nodes, relationships can be discovered to reduce and simplify chains or extended paths between multiple nodes. Results of node reductions and relationship simplification can be captured as a selected relation graph 150. The node reduction module 112 and/or the relationship simplification module 114 can also interact with a user interface 160, for example, to allow one or more users to confirm proposed simplifications and reductions in graph complexity. Results of interactions with the user interface 160 can be used to train one or more machine-learning processes of the relation result selector 110, which may result in higher accuracy reductions and simplifications in future database conversions.

The data structure conversion module 122 of the data structure converter 120 can access nodes, relationships, and association rules from the selected relation graph 150. This information can be applied in extracting data and relationships from the relational database 130 to create a result data graph 170 as a graph database model of the relational database 130. For example, the selected relation graph 150 may define how tables and fields of the relational database 130 are interrelated, and the data structure conversion module 122 can populate the result data graph 170 with data values from the relational database 130 as nodes with relationships defined between the nodes based on the selected relation graph 150.

Figure 2:
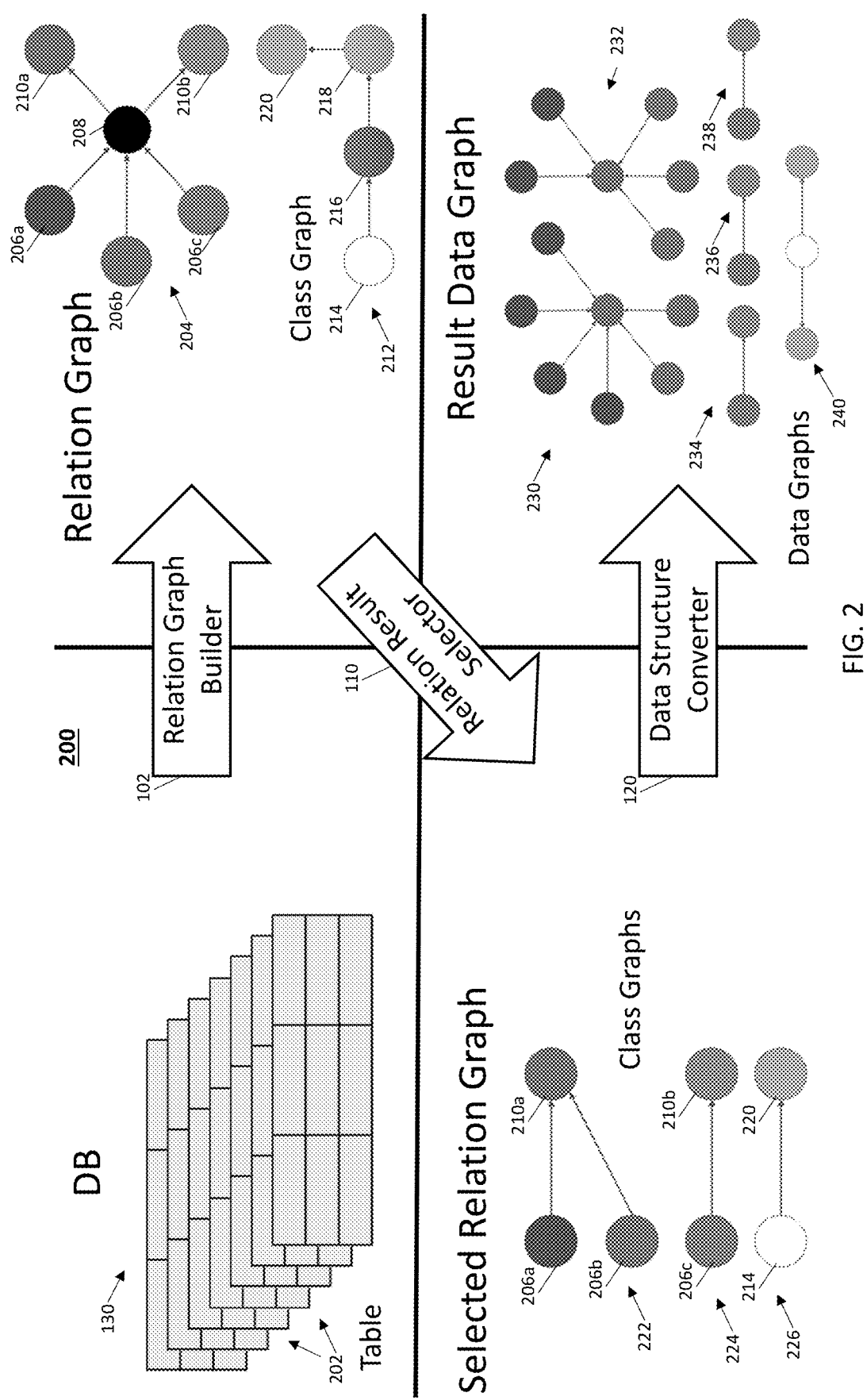
FIG. 2 depicts a high-level example of a data structure conversion process according to one or more embodiments of the present invention.

FIG. 2 depicts a high-level example of a data structure conversion process 200 according to one or more embodiments of the present invention. The data structure conversion process 200 illustrates examples of conversions performed by the relation graph builder 102, the relation result selector 110, and the data structure converter 120. The relation graph builder 102 can access a plurality of tables 202 of the relational database 130 to produce a relation graph 204, which is an example of relation graph 140 of FIG. 1. In the example of FIG. 2, relation graph 204 includes multiple input nodes 206a, 206b, 206c with input relationships to a key node 208. The key node 208 has input relationships to output nodes 210a, 210b. The relation graph 204 is an example of a multiple input and multiple output class graph defining how various data types relate to each other. The relation graph builder 102 can also discover one or more class graphs 212 that form a relationship chain of data types, for instance, from node 214 to node 216 to node 218 to node 220.

The relation result selector 110 can simplify the relation graph 204 and class graph 212 through node reduction and relationship simplification. For example, when intermediate nodes (e.g., key nodes) are removed to simplify end-to-end paths, a resulting class graph 222 can relate input nodes 206a, 206b to output node 210a. Class graph 224 can relate input node 206c to output node 210b. Class graph 226 can relate node 214 to node 220.

The data structure converter 120 can use class graphs 222, 224, 226 as reduced and simplified to generate result data graphs 230, 232, 234, 236, 238, 240 based on mapping data from the relational database 130 using class relationships defined by class graphs 222, 224, 226 for selected nodes. Although a particular example is depicted in FIG. 2, it will be understood that many different combinations of graph structures can be generated in embodiments depending on the complexity of relationships defined between the tables 202 and values therein.

Figure 3:
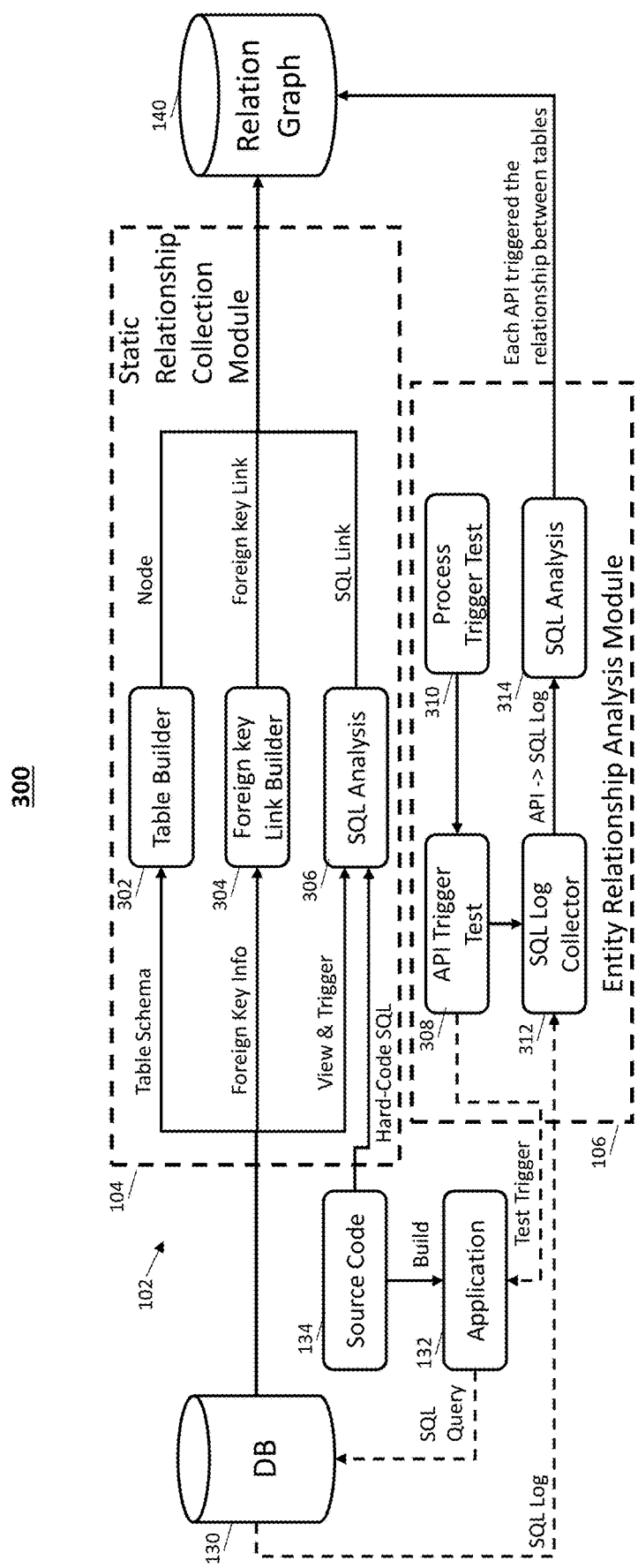
FIG. 3 depicts a block diagram of a relation graph builder according to one or more embodiments of the present invention.

FIG. 3 depicts a block diagram 300 of a portion of the relation graph builder 102 of FIG. 1 according to one or more embodiments of the present invention. The static relationship collection module 104 of the relation graph builder 102 can collect and analyze the static relationships from source code 134, any available SQL sources, and database design information from the relational database 130. The static relationships can include nodes from a table definition, relationships from foreign key information, join SQL relationships from view and trigger information, and/or source code 134. The static relationship collection module 104 can include a table builder 302, a foreign key link builder 304, and SQL analysis 306. The table builder 302 can access table schema information from the relational database 130 and translate the information into nodes of the relation graph 140. The foreign key link builder 304 can access foreign key information from the relational database 130 and generate foreign key links to establish links of edges between nodes of the relation graph 140 and identify key nodes that link multiple nodes. The SQL analysis 306 can access view and trigger event information associated with SQL statements received at the relational database 130 based in part on hard-coded SQL in source code 134 to establish SQL links to connect nodes in the relation graph 140.

The entity relationship analysis module 106 can include an API trigger test 308, a process trigger test 310, a SQL log collector 312, and SQL analysis 314. The process trigger test 310 can create test triggers to test process features with a range of test cases. The test triggers can be sent to the API trigger test 308 to convert the test triggers into an API-compliant format for the application 132 and provide test information to the SQL log collector 312. The SQL log collector 312 can receive SQL log results from the relational database 130 in response to SQL queries produced by the application 132 based on the test triggers. SQL log collector 312 can perform formatting adjustments to the results and provide the results to SQL analysis 314. The SQL analysis 314 can summarize relationships between tables of the relational database 130 based on the test triggers and results to establish one or more node links in the relation graph 140. These types of relationships include intrinsic relationships that can be defined at an entity/business layer and may not be directly documented within the relational database 130.

Figure 4:
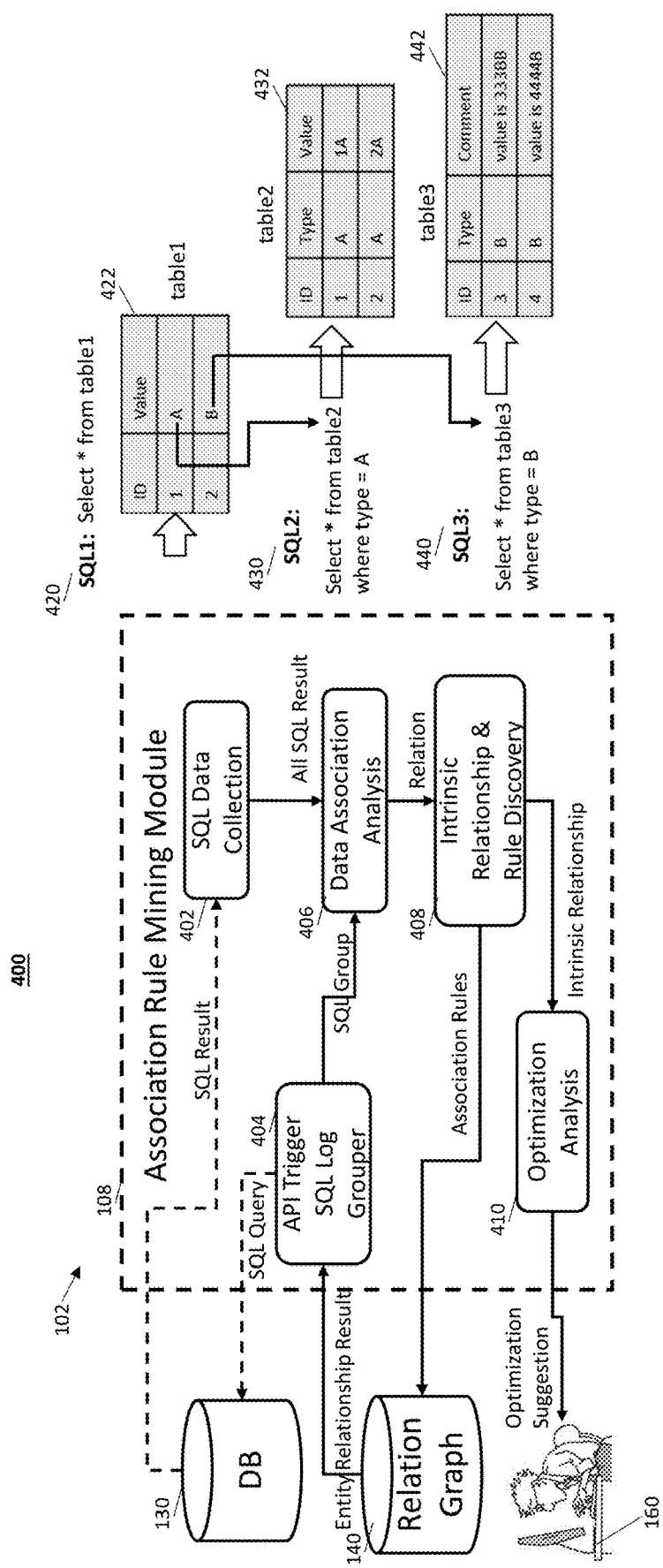
FIG. 4 depicts a block diagram of association rule mining according to one or more embodiments of the present invention.

FIG. 4 depicts a block diagram 400 of association rule mining according to one or more embodiments of the present invention. The association rule mining module 108 can discover intrinsic relationships from results of the entity relationship analysis module 106, which can extract an entity model from a legacy model embodied in the relational database 130. The association rule mining module 108 can include SQL data collection 402, API trigger SQL log grouper 404, data association analysis 406, intrinsic relationship and rule discovery 408, and optimization analysis 410.

Entity relationship results from the relation graph 140 can be analyzed by the API trigger SQL log grouper 404 and used to generate SQL queries to the relational database 130. The SQL results of the queries can be provided to SQL data collection 402 to aggregate SQL results. The grouped SQL results and SQL group definition can be provided to the data association analysis 406. The data association analysis 406 can analyze the order of SQL groups and results to discover intrinsic relationships between groupings. The intrinsic relationship and rule discovery 408 can generate an intrinsic relationship graph and provide association rules to the relation graph 140. The optimization analysis 410 can find differences between table relations and subgraphs of the relation graph 140 based on each test case. Differences can be output to user interface 160 as an optimization suggestion. The optimization suggestion can include various suggested changes to one or more aspects of the system 100, such as more efficient queries or changes in relationships. For instance, redundant or circular relationships can be identified. Further, redundant queries that at least partially overlap may be decomposed into multiple queries having a smaller independent scope to reduce processing resource and memory utilization by removing multiple requests for common data sets. The optimizations can result in changes to various system elements, such as the relational database 130, the application 132, and/or the source code 134. Upon making the optimizations, various outputs of the system 100 can be updated, such as the relation graph 140, the selected relation graph 150, and/or the result data graph 170.

As an example, a first SQL query 420 may select data from a first table 422. A second SQL query 430 may be a conditional selection from a second table 432 based on a value in the first table 422 (e.g., a type of "A" in table 432 matching a value of "A" in table 422). A third SQL query 440 may be a conditional selection from a third table 442 based on a value of the first table 422 (e.g., a type of "B" in table 442 matching a value of "B" in table 422). Although a key table may not exist within the relational database 130 that directly defines these relationships, the association rule mining module 108 can discover relationships, such as conditional relationships linked by selection rules that intrinsically link multiple tables together through SQL queries and results, such as tables 422, 432, 442. If an additional query (e.g., a fourth query) was identified as including a combination of the second SQL query 430 and the third SQL query 440, the optimization analysis 410 could recommend eliminating the fourth query as being redundant, for example.

Figure 5:
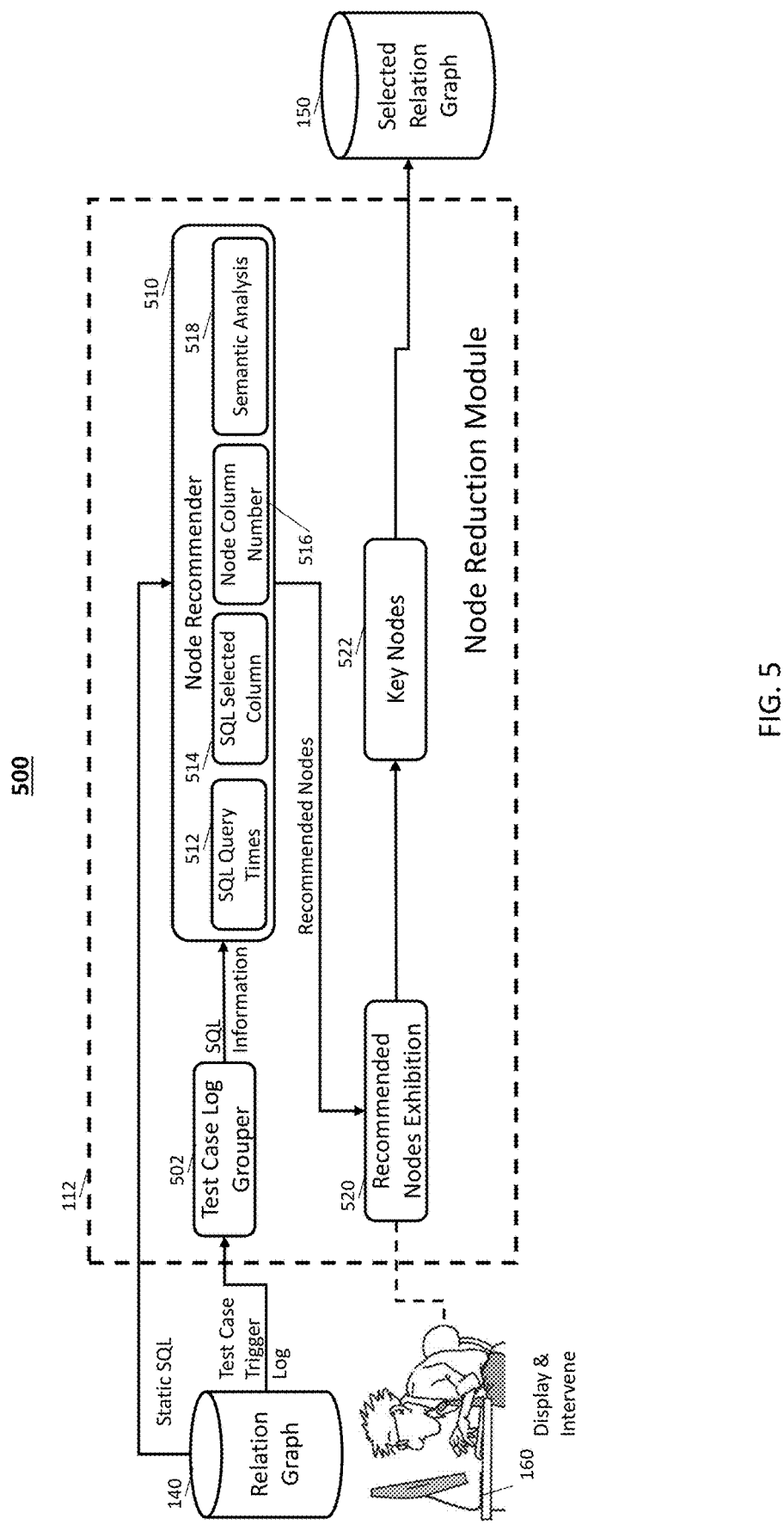
FIG. 5 depicts a block diagram of node reduction analysis for relation graphs according to one or more embodiments of the present invention.

FIG. 5 depicts a block diagram 500 of node reduction module 112 for relation graphs according to one or more embodiments of the present invention. The node reduction module 112 can access the relation graph 140 to filter, analyze, and receive user confirmation to select key nodes in graphs. The key nodes can be tracked through a key table, which can include basic information or connect key links between multiple nodes. The node reduction module 112 can include a test case log grouper 502 that accesses a test case trigger log of test triggers used in forming the relation graph 140. The test case log grouper 502 can group test case trigger log data as SQL information and remove data that occurs infrequently, for example. The SQL information from the test case log grouper 502 and static SQL from the relation graph 140 can be provided to a node recommender 510. The node recommender 510 can include analysis functions that analyze various relational features, such as SQL query times 512, SQL selected column 514, node column number 516, and sematic analysis 518. The node recommender 510 can rank nodes by importance, where a node which never appears in a selected column is determined to be less important. SQL and node selection data can be determined by the SQL selected column 514 and node column number 516 respectively. SQL query times 512 can be used to determine frequency of use of particular columns. Semantic analysis 518 can analyze column names and table names of nodes to output a list of nodes ordered by importance of recommended nodes as potential key nodes.

The recommended nodes can be sent to recommended nodes exhibition 520 that can seek user confirmation by displaying the recommended nodes and supporting information to a user through the user interface 160. The user can decide which node should be key nodes 522. If the user does not provide input, the key nodes can be default nodes as identified through the node recommender 510. The key nodes 522 are used to reduce the relation graph 140 as the selected relation graph 150.

Figure 6:
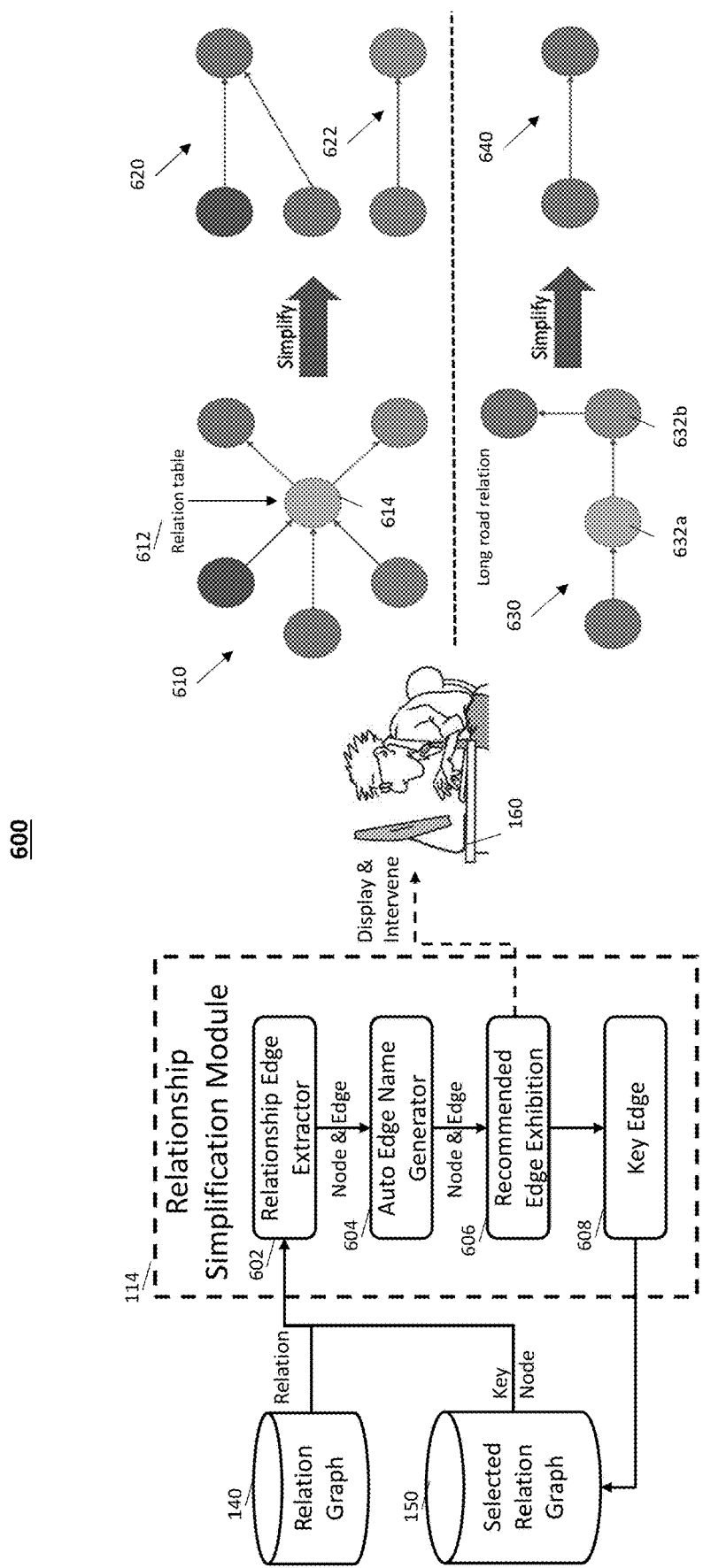
FIG. 6 depicts a block diagram of relationship simplification for relation graphs according to one or more embodiments of the present invention.

FIG. 6 depicts a block diagram 600 of relationship simplification module 114 for relation graphs according to one or more embodiments of the present invention. The relationship simplification module 114 can create useful relationships based on the key nodes identified by the node reduction module 112. The relationship simplification module 114 can include a relationship edge extractor 602 that may simplify a graph which contains a relationship table. Relationship data can be extracted from relation graph 140, and key nodes can be identified based on the selected relation graph 150. An automatic edge name generator 604 can generate an edge name for a recommended edge for edge reduction. The recommended name and schema of an edge can be displayed to the user interface 160 by recommended edge exhibition 606. A user can rename or adjust the automatically generated edge name and connection parameters, or a default configuration, as suggested by the automatic edge name generator 604, can be used to create a key edge that defines a simplified link between two nodes through removing one or more key nodes or intermediate nodes.

As an example, a graph 610 with a relation table 612 can be simplified by removing key node 614 to produce simplified graphs 620, 622. Where there is an extended "long road" relation, such as graph 630 that includes two or more intermediate nodes 632a, 632b, the relationship simplification module 114 can remove the two or more intermediate nodes 632a, 632b to form a simplified graph 640. Although two examples are depicted in FIG. 6, it will be understood that many connection relationships can be simplified using the relationship simplification module 114.

Figure 7:
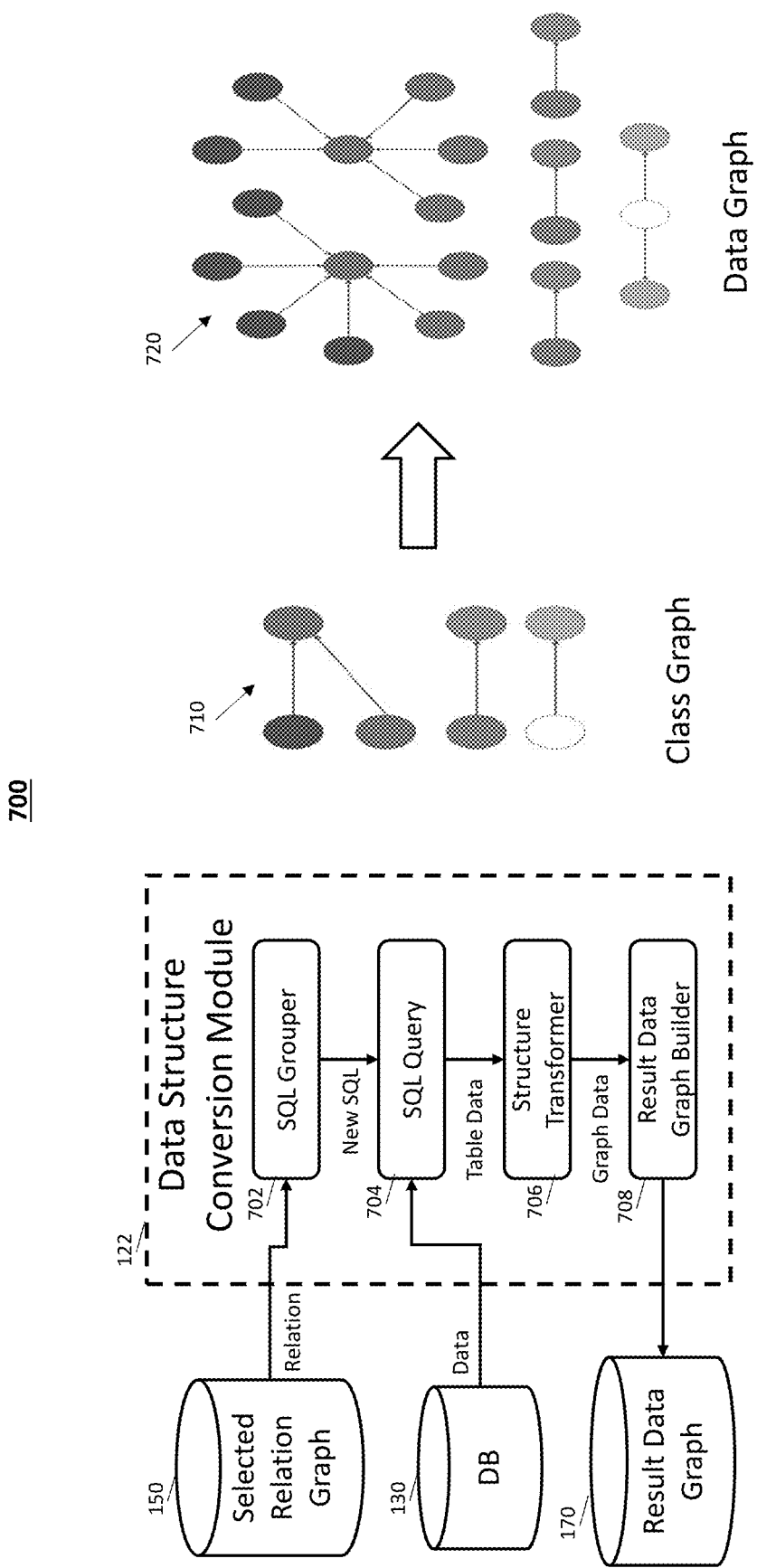
FIG. 7 depicts a block diagram of data structure conversion according to one or more embodiments of the present invention.

FIG. 7 depicts a block diagram 700 of data structure conversion module 122 according to one or more embodiments of the present invention. The data structure conversion module 122 can collect relationships and rules from the selected relation graph 150 and perform groupings of SQL by rules and relations. The groupings can be used to form new SQL to get associated table data from the relational database 130 as SQL query 704. A structure transformer 706 can transform table data from SQL query 704 into graph data. Collected relationships and properties of the graph data can then be inserted into the result data graph 170 by a result data graph builder 708. The result data graph 170 can include relationship and nodes as determined by the system 100 of FIG. 1 in combination with any input received through the user interface 160 of FIG. 1.

Class graphs 710 can be simplified and reduced expressions of how data types from various sources relate to each other after key nodes are removed. The conversion process can populate data graphs 720 using the class graphs 710 to define node type relationships and data extracted from the relational database 130. Data graphs 720 embodied as one or more result data graphs 170 can establish an equivalent model to the underlying legacy model used in processing relational database 130. Many types of relationships can be supported in the data graphs 720, such as one-to-one, one-to-many, many-to-one, and many-to-many relationships based on the class graphs 710. One or more result data graphs 170 can be generated by the system 100 of FIG. 1 using the one or more class graphs 710 as a graph database model of the relational database 130.

Figure 8:
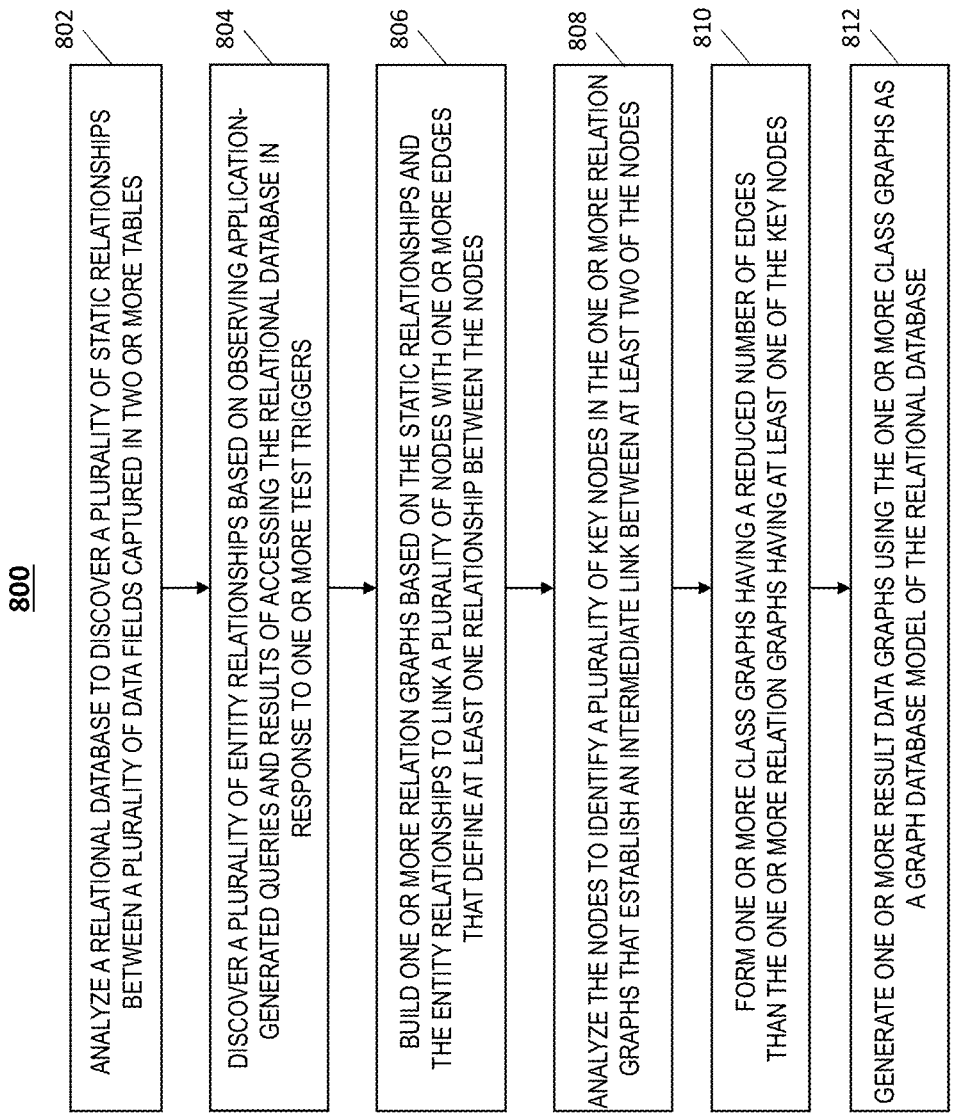
FIG. 8 depicts a flowchart of a method according to one or more embodiments of the present invention.

FIG. 8 depicts a flowchart of a method 800 for graph database generation based on relationship extraction from a relational database according to one or more embodiments of the present invention. The method 800 is described with respect to FIGS. 1-8. Although the method 800 is depicted in a particular order, it will be understood that some steps may be performed in a different order and may be combined or further divided into additional steps. The method 800 that is depicted in FIG. 8 can be implemented using a computer system and/or cloud-based system as further described herein in reference to FIGS. 9-11, where a processing unit can be a central processing unit, one or more computer processors, and/or distributed processing resources spread between multiple computer systems.

At block 802, a processing unit can analyze a relational database 130 to discover a plurality of static relationships between a plurality of data fields captured in two or more tables.

At block 804, the processing unit can discover a plurality of entity relationships based on observing application-generated queries and results of accessing the relational database 130 in response to one or more test triggers. The entity relationships can also be discovered based on analyzing one or more static relationships defined in source code of an application 132 that is configured to query the relational database 130.

At block 806, the processing unit can build one or more relation graphs 140 based on the static relationships and the entity relationships to link a plurality of nodes with one or more edges that define at least one relationship between the nodes. The one or more relation graphs 140 can be built based on analyzing log results from the one or more test triggers sent to an application programming interface of the application 132.

At block 808, the processing unit can analyze the nodes to identify a plurality of key nodes in the one or more relation graphs 140 that establish an intermediate link between at least two of the nodes.

At block 810, the processing unit can form one or more class graphs having a reduced number of edges than the one or more relation graphs 140 having at least one of the key nodes.

At block 812, the processing unit can generate one or more result data graphs 170 using the one or more class graphs as a graph database model of the relational database 130.

A plurality of intrinsic relationships can be discovered by mining association rules. The intrinsic relationships can be analyzed to find one or more differences between table relations and graph relations based on one or more test cases. A suggested optimization can be determined based on the one or more differences. The suggested optimization can be output to a user interface 160.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
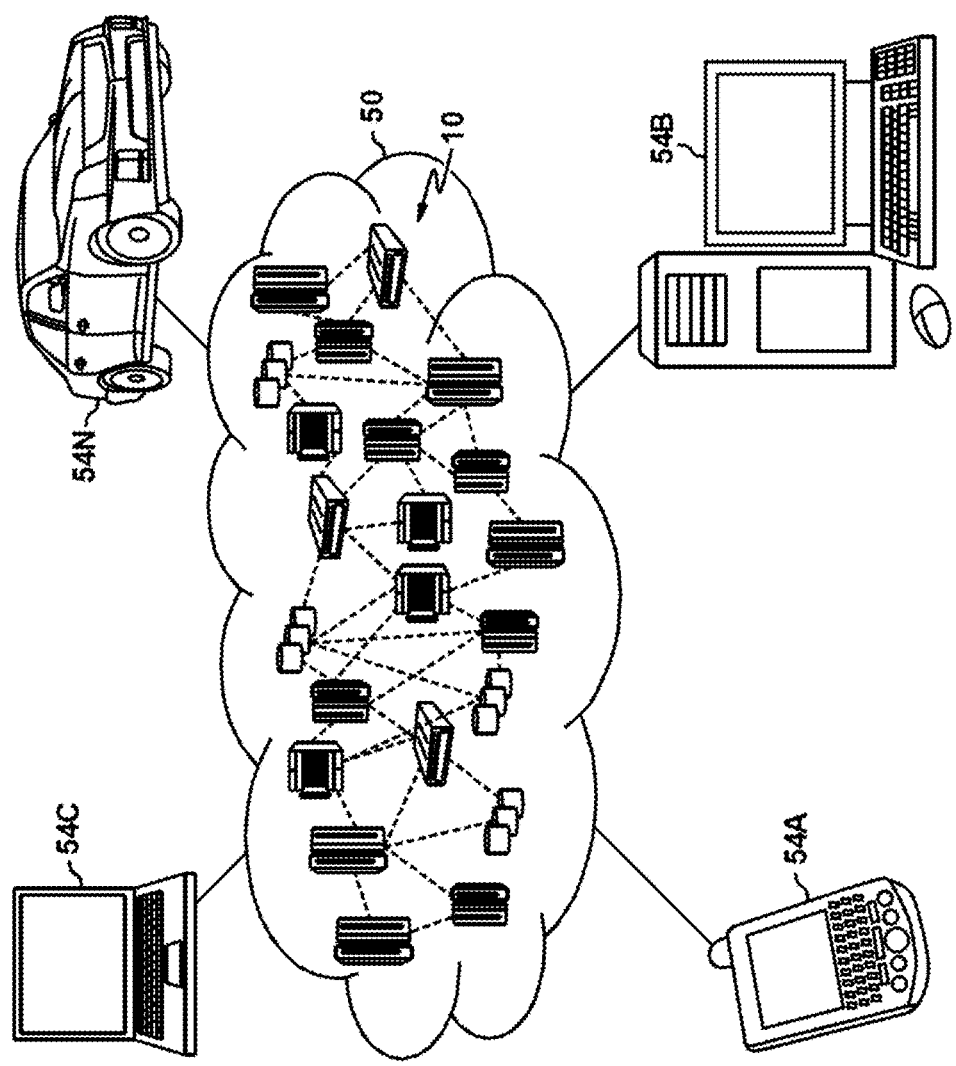
FIG. 9 depicts a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
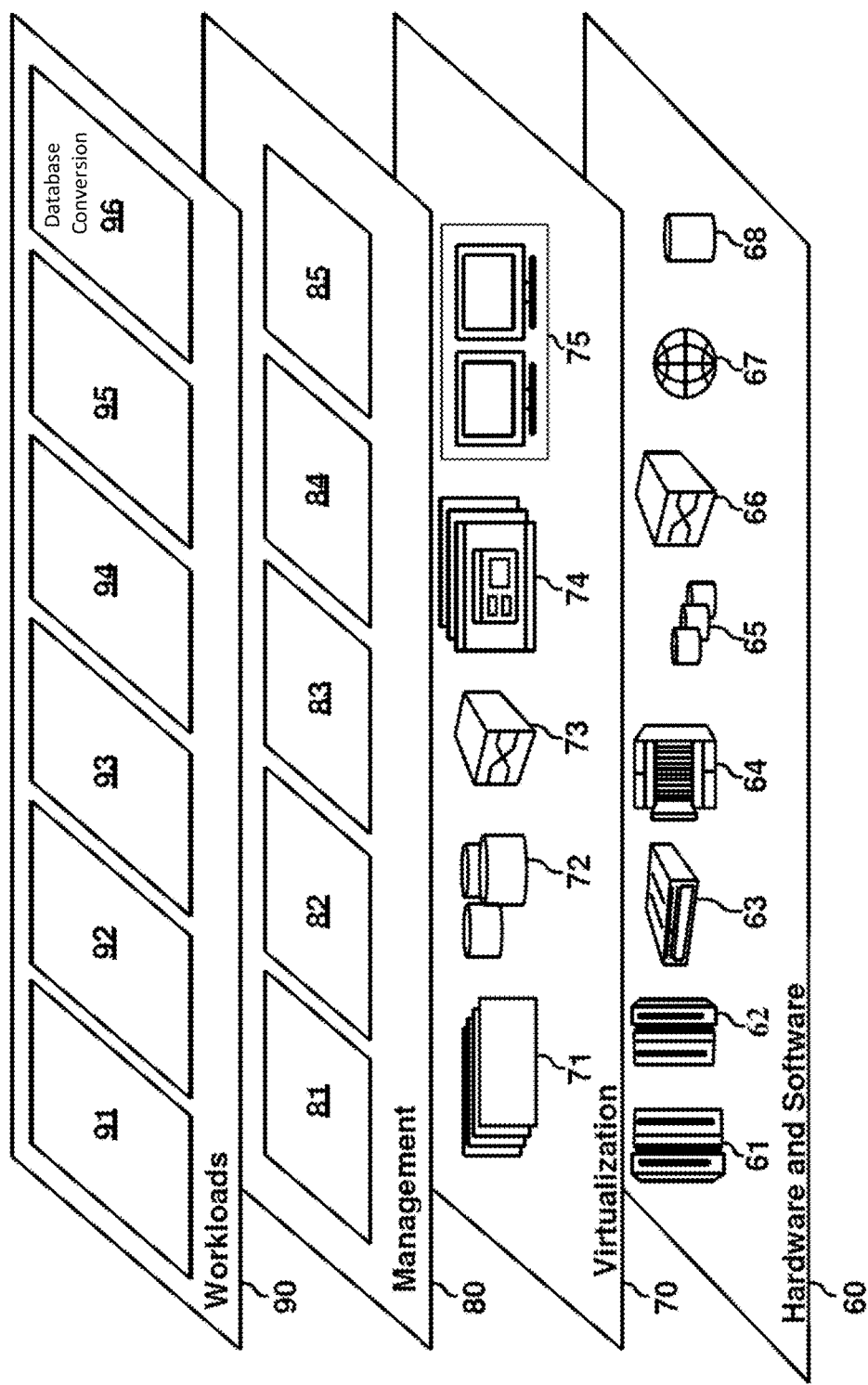
FIG. 10 depicts abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database conversion 96 that implements at least a portion of system 100 of FIG. 1.

Figure 11:
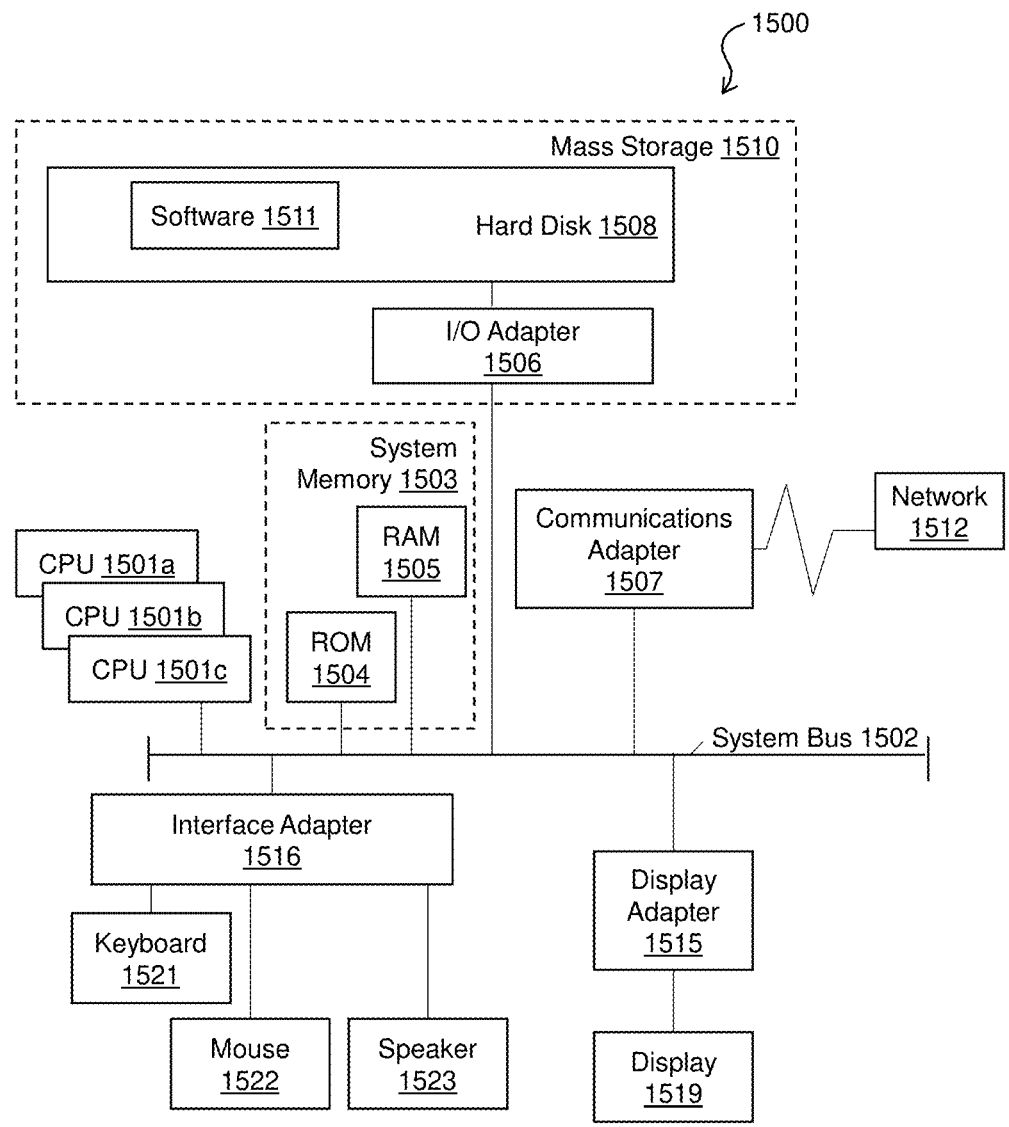
FIG. 11 depicts a computing system according to one or more embodiments of the present invention.

Turning now to FIG. 11, a computer system 1500 is generally shown in accordance with an embodiment. The computer system 1500 can be a computing system being used to operate the system 100 of FIG. 1. The computer system 1500 can be an electronic, computer framework comprising and/or employing any number and combination of computing devices and networks utilizing various communication technologies, as described herein. The computer system 1500 can be easily scalable, extensible, and modular, with the ability to change to different services or reconfigure some features independently of others. The computer system 1500 may be, for example, a server, desktop computer, laptop computer, tablet computer, or smartphone. In some examples, computer system 1500 may be a cloud computing node. Computer system 1500 may be described in the general context of computer system executable instructions, such as program modules, being executed by a computer system. Generally, program modules may include routines, programs, objects, components, logic, data structures, and so on that perform particular tasks or implement particular abstract data types. Computer system 1500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system 1500 has one or more central processing units (CPU(s)) 1501a, 1501b, 1501c, etc. (collectively or generically referred to as processor(s) 1501). The processors 1501 can be a single-core processor, multi-core processor, computing cluster, or any number of other configurations. The processors 1501, also referred to as processing circuits, are coupled via a system bus 1502 to a system memory 1503 and various other components. The system memory 1503 can include a read only memory (ROM) 1504 and a random access memory (RAM) 1505. The ROM 1504 is coupled to the system bus 1502 and may include a basic input/output system (BIOS), which controls certain basic functions of the computer system 1500. The RAM is read-write memory coupled to the system bus 1502 for use by the processors 1501. The system memory 1503 provides temporary memory space for operations of said instructions during operation. The system memory 1503 can include random access memory (RAM), read only memory, flash memory, or any other suitable memory systems.

The computer system 1500 comprises an input/output (I/O) adapter 1506 and a communications adapter 1507 coupled to the system bus 1502. The I/O adapter 1506 may be a small computer system interface (SCSI) adapter that communicates with a hard disk 1508 and/or any other similar component. The I/O adapter 1506 and the hard disk 1508 are collectively referred to herein as a mass storage 1510.

Software 1511 for execution on the computer system 1500 may be stored in the mass storage 1510. The mass storage 1510 is an example of a tangible storage medium readable by the processors 1501, where the software 1511 is stored as instructions for execution by the processors 1501 to cause the computer system 1500 to operate, such as is described herein below with respect to the various Figures. Examples of computer program product and the execution of such instruction is discussed herein in more detail. The communications adapter 1507 interconnects the system bus 1502 with a network 1512, which may be an outside network, enabling the computer system 1500 to communicate with other such systems. In one embodiment, a portion of the system memory 1503 and the mass storage 1510 collectively store an operating system, which may be any appropriate operating system, such as the z/OS or AIX operating system from IBM Corporation, to coordinate the functions of the various components shown in FIG. 11.

Additional input/output devices are shown as connected to the system bus 1502 via a display adapter 1515 and an interface adapter 1516 and. In one embodiment, the adapters 1506, 1507, 1515, and 1516 may be connected to one or more I/O buses that are connected to the system bus 1502 via an intermediate bus bridge (not shown). A display 1519 (e.g., a screen or a display monitor) is connected to the system bus 1502 by a display adapter 1515, which may include a graphics controller to improve the performance of graphics intensive applications and a video controller. A keyboard 1521, a mouse 1522, a speaker 1523, etc. can be interconnected to the system bus 1502 via the interface adapter 1516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 1500 includes processing capability in the form of the processors 1501, and storage capability including the system memory 1503 and the mass storage 1510, input means such as the keyboard 1521 and the mouse 1522, and output capability including the speaker 1523 and the display 1519.

In some embodiments, the communications adapter 1507 can transmit data using any suitable interface or protocol, such as the internet small computer system interface, among others. The network 1512 may be a cellular network, a radio network, a wide area network (WAN), a local area network (LAN), or the Internet, among others. An external computing device may connect to the computer system 1500 through the network 1512. In some examples, an external computing device may be an external webserver or a cloud computing node.

It is to be understood that the block diagram of FIG. 11 is not intended to indicate that the computer system 1500 is to include all of the components shown in FIG. 11. Rather, the computer system 1500 can include any appropriate fewer or additional components not illustrated in FIG. 11 (e.g., additional memory components, embedded controllers, modules, additional network interfaces, etc.). Further, the embodiments described herein with respect to computer system 1500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    analyzing, by a processing unit, a relational database to discover a plurality of static relationships between a plurality of data fields captured in two or more tables;
    discovering, by the processing unit, a plurality of entity relationships based on observing application-generated queries and results of accessing the relational database in response to one or more test triggers;
    building, by the processing unit, one or more relation graphs based on the static relationships and the entity relationships to link a plurality of nodes with one or more edges that define at least one relationship between the nodes;
    forming, by the processing unit, one or more class graphs having a reduced number of edges than the one or more relation graphs; and
    generating, by the processing unit, one or more result data graphs using the one or more class graphs as a graph database model of the relational database.

2. The computer-implemented method of claim 1, further comprising:
    analyzing the nodes to identify a plurality of key nodes in the one or more relation graphs that establish an intermediate link between at least two of the nodes.

3. The computer-implemented method of claim 2, wherein the one or more class graphs are formed based on the one or more relation graphs having at least one of the key nodes.

4. The computer-implemented method of claim 1, wherein the entity relationships are discovered based on analyzing one or more static relationships defined in source code of an application that is configured to query the relational database.

5. The computer-implemented method of claim 4, wherein the one or more relation graphs are built based on analyzing log results from the one or more test triggers sent to an application programming interface of the application.

6. The computer-implemented method of claim 1, further comprising:
    mining association rules to discover a plurality of intrinsic relationships.

7. The computer-implemented method of claim 6, further comprising:
    analyzing the intrinsic relationships to find one or more differences between table relations and graph relations based on one or more test cases;
    determining a suggested optimization based on the one or more differences; and
    outputting the suggested optimization to a user interface.

8. A system comprising:
    a memory having computer readable instructions; and one or more processors for executing the computer readable instructions, the computer readable instructions controlling the one or more processors to perform operations comprising:
- analyzing a relational database to discover a plurality of static relationships between a plurality of data fields captured in two or more tables;
- discovering a plurality of entity relationships based on observing application-generated queries and results of accessing the relational database in response to one or more test triggers;
- building one or more relation graphs based on the static relationships and the entity relationships to link a plurality of nodes with one or more edges that define at least one relationship between the nodes;
- forming one or more class graphs having a reduced number of edges than the one or more relation graphs; and
- generating one or more result data graphs using the one or more class graphs as a graph database model of the relational database.

9. The system of claim 8, wherein the computer readable instructions are configured to control the one or more processors to perform operations comprising:
- analyzing the nodes to identify a plurality of key nodes in the one or more relation graphs that establish an intermediate link between at least two of the nodes.

10. The system of claim 9, wherein the one or more class graphs are formed based on the one or more relation graphs having at least one of the key nodes.

11. The system of claim 8, wherein the entity relationships are discovered based on analyzing one or more static relationships defined in source code of an application that is configured to query the relational database.

12. The system of claim 11, wherein the one or more relation graphs are built based on analyzing log results from the one or more test triggers sent to an application programming interface of the application.

13. The system of claim 8, wherein the computer readable instructions are configured to control the one or more processors to perform operations comprising:
- mining association rules to discover a plurality of intrinsic relationships.

14. The system of claim 13, wherein the computer readable instructions are configured to control the one or more processors to perform operations comprising:
- analyzing the intrinsic relationships to find one or more differences between table relations and graph relations based on one or more test cases;
- determining a suggested optimization based on the one or more differences; and
- outputting the suggested optimization to a user interface.

15. A computer program product comprising a computer readable storage medium having program instructions embodied therewith, the program instructions executable by a processor to cause the processor to perform operations comprising:
- analyzing a relational database to discover a plurality of static relationships between a plurality of data fields captured in two or more tables;
- discovering a plurality of entity relationships based on observing application-generated queries and results of accessing the relational database in response to one or more test triggers;
- building one or more relation graphs based on the static relationships and the entity relationships to link a plurality of nodes with one or more edges that define at least one relationship between the nodes;
- forming one or more class graphs having a reduced number of edges than the one or more relation graphs; and
- generating one or more result data graphs using the one or more class graphs as a graph database model of the relational database.

16. The computer program product of claim 15, wherein the program instructions are executable by the processor to cause the processor to perform operations comprising:
- analyzing the nodes to identify a plurality of key nodes in the one or more relation graphs that establish an intermediate link between at least two of the nodes.

17. The computer program product of claim 16, wherein the one or more class graphs are formed based on the one or more relation graphs having at least one of the key nodes.

18. The computer program product of claim 15, wherein the entity relationships are discovered based on analyzing one or more static relationships defined in source code of an application that is configured to query the relational database.

19. The computer program product of claim 18, wherein the one or more relation graphs are built based on analyzing log results from the one or more test triggers sent to an application programming interface of the application.

20. The computer program product of claim 15, wherein the program instructions are executable by the processor to cause the processor to perform operations comprising:
- mining association rules to discover a plurality of intrinsic relationships;
- analyzing the intrinsic relationships to find one or more differences between table relations and graph relations based on one or more test cases;
- determining a suggested optimization based on the one or more differences; and
- outputting the suggested optimization to a user interface.

* * * * *